United States Patent

[11] 3,602,815

| [72] | Inventors | Fritz Rumpelein<br>Munchen;<br>Paul Kopf, Munchen-Unterhaching; Franz<br>Landbrecht, Munchen-Unterhaching, all of,<br>Germany |
|------|-----------|------|
| [21] | Appl. No. | 822,877 |
| [22] | Filed | May 8, 1969 |
| [45] | Patented | Aug. 31, 1971 |
| [73] | Assignee | Agfa-Gevaest Aktiengesellschaft<br>Leverkusen, Germany |
| [32] | Priority | May 31, 1968 |
| [33] | | Germany |
| [31] | | P 17 66 384.2 |

[54] MOVING-COIL INSTRUMENT HAVING A HOUSING WITH OPENINGS FOR INSERTION OR WITHDRAWAL OF THE CORE AND COIL
10 Claims, 1 Drawing Fig.

[52] U.S. Cl. .................................................... 324/151 A, 324/156
[51] Int. Cl. ...................................................... G01r 1/16, G01r 1/04
[50] Field of Search ........................................... 324/151, 151 A, 156; 335/222

[56] References Cited
UNITED STATES PATENTS
2,518,609  8/1950  Fogle ........................ 324/151 A
2,650,349  8/1953  Lamb ........................ 324/151 A

*Primary Examiner*—Alfred E. Smith
*Attorney*—Michael S. Striker

ABSTRACT: The housing of a electrical measuring instrument has two openings located opposite each other in a cylindrical wall of the housing and respectively permitting insertion or withdrawal of a moving-coil assembly and a core magnet in such a way that the magnet can be inserted or withdrawn through one opening and an open side of the moving coil assembly and that the moving coil assembly can be inserted or withdrawn through the other opening independently of the core magnet. The magnet is mounted on the arm of an insulating holder which is separably secured to the housing by a screw and carries an electric terminal as well as a retainer for the return spring which biases the moving coil assembly to zero position.

PATENTED AUG 31 1971    3,602,815
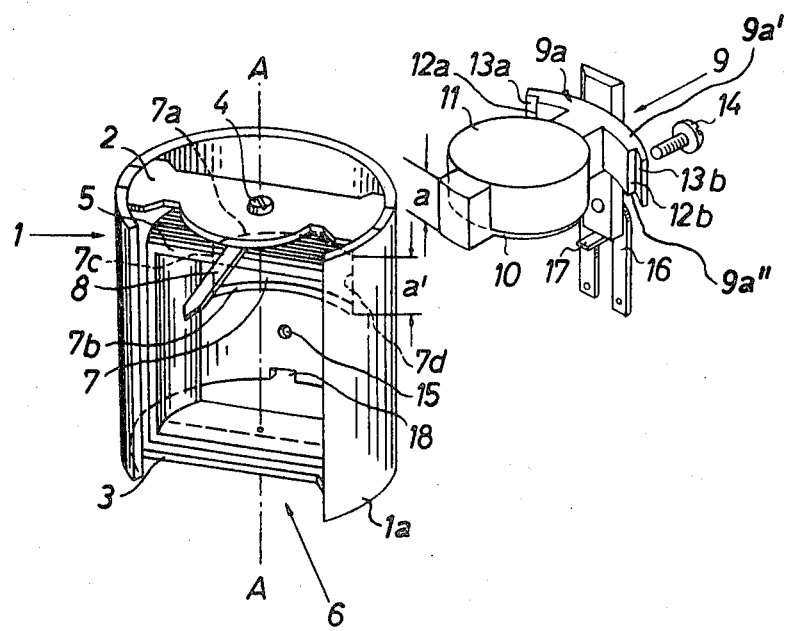
INVENTOR.
FRITZ RÜMPELEIN
BY PAUL KOPF
FRANZ LANDBRECHT

MOVING-COIL INSTRUMENT HAVING A HOUSING WITH OPENINGS FOR INSERTION OR WITHDRAWAL OF THE CORE AND COIL

BACKGROUND OF THE INVENTION

The present invention relates to moving-coil measuring instruments, and more particularly to improvements in electrical instruments wherein a feedback element surrounds a moving coil assembly and the latter is oscillatable about a core magnet.

A drawback of presently known moving-coil instruments (such as galvanometers which are used in photographic apparatus or for similar purposes) is that the core magnet must be installed prior to or simultaneously with the moving coil assembly. If the extent and/or direction of magnetization of the magnet is unsatisfactory, the moving coil assembly must be withdrawn from the housing prior to withdrawal of the core magnet. Such work consumes considerable time and must be carried out by skilled persons because the moving coil assembly is mounted in sensitive bearings which are carried by the housing of the moving-coil instrument.

SUMMARY OF THE INVENTION

An object of our invention is to provide a moving-coil instrument wherein the core magnet can be installed or withdrawn regardless of whether the moving-coil assembly is already mounted in or removed from the housing of the instrument.

Another object of the invention is to provide a moving-coil measuring instrument wherein the core magnet can be installed and removed independently of the moving coil assembly and/or vice versa.

A further object of the invention is to provide a novel housing for the moving-coil instrument and to provide the instrument with a novel supporting structure for the core magnet.

The improved moving-coil measuring instrument comprises a hollow housing which preferably constitutes the feedback element and is provided with at least one opening or window, a hollow moving coil assembly which includes a frame, a coil on the frame and a pointer on the frame and is mounted in the housing for oscillatory movement about a predetermined axis, the frame of the moving coil assembly having an open side which is movable into at least partial registry with the opening of the housing, and an insert which includes a holder separably secured to the housing and having an arm extending through the opening and through the open side of the moving coil assembly, and a core magnet supported by the arm and located in the interior of the assembly when the insert is separably secured to the housing, preferably by means of one or more threaded fasteners. The configuration of the holder, its arm and the magnet is such that they permit oscillatory movements of the moving coil assembly when the insert is properly secured to the housing. Thus, the insert does not interfere with oscillatory movements of the moving coil assembly and the latter does not interfere with insertion or withdrawal of the core magnet. The housing is preferably provided with a second opening which permits insertion or withdrawal of the moving coil assembly while the insert remains connected to the housing.

The novel features which are considered as characteristic of the invention are set forth in particular in the appended claims. The improved moving-coil instrument itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is an exploded perspective view of a moving-coil measuring instrument which embodies out invention.

DESCRIPTION OF THE PREFERRED EMBODIMENTS

The drawing illustrates a portion of a moving-coil measuring instrument which comprises a hollow metallic housing 1 constituting the feedback element of the instrument, a moving coil assembly 5 which is oscillatable in the interior of the housing about an axis A—A which coincides with the axis of a substantially cylindrical first wall 1a of the housing, and an insert 9 which includes a core magnet 11 of a holder 9a having an arm 10 which is supportingly connected with the magnet 11. The housing 1 further comprises two end walls or bridges 2, 3 which extend transversely across the axial ends of the cylindrical wall 1a and are provided with bearings 4 for the pivot pins or staffs of the moving coil assembly 5. At least one of the bearings 4 is adjustable in the direction of the axis A—A, i.e., in the axial direction of the wall 1a. This wall 1a is provided with two openings or windows 6 and 7 the former of which permits insertion and withdrawal of the moving coil assembly 5 independently of the insert 9. The opening 7 permits insertion or withdrawal of the magnet 11 and arm 10 independently of the coil assembly 5. The openings 6, 7 are located substantially diametrically opposite each other. The moving coil assembly 5 includes a customary frame, a coil which is convoluted around the frame, and a pointer 8 which extends outwardly through the opening 6. The frame of the assembly 5 has two open sides one of which can be moved into full or substantial registry with the opening 7 so as to permit insertion and withdrawal of the magnet 11 and arm 10 into and from the interior of the frame.

The holder 9a consists of electrically insulating material and the height a of its major portion (including the arm 10) equals or closely approximates the height a' of the opening 7 (as considered in the axial direction of wall 1a). The wall 1a is provided with locating surfaces 7a, 7b, 7c, 7d which flank the opening 7 and abut against complementary surfaces 9a', 9a'', 12a, 12b of the holder 9a when the insert 9 is properly secured to the housing 1. The surfaces 13a, 13b of the holder 9a then abut against the adjoining portions of the external surface on the wall 1a to insure that the magnet 11 is properly positioned in the axial and radial directions of the wall 1a and hence with reference to the moving coil assembly 5. The fastener means for separably securing the insert 9 to the housing 1 preferably includes at least one threaded element, such as a screw 14 which extends through a hole of the insert 9 and into a tapped bore 15 of the wall 1a. The holder 9a carries an electric terminal 16 which is connectable to an electrical conductor, not shown, and has a spring retainer 17, here shown as a lug, which can be connected to one end of a restoring spring (not shown) serving to bias the moving coil assembly 5 to zero position. The restoring spring is preferably a torsion spring which conducts current. The spring retainer 17 extends radially inwardly through an opening or cutout 18 of the wall 1a and into the interior of the housing 1.

During assembling of the moving-coil instrument, the moving coil assembly 5 including the frame, coil and pointer 8 is mounted in the housing 1 in the first step. In the next step, the insert 9 is attached to the housing 1 by means of the threaded fastener 14 in such a way that the surfaces 9a', 9a'', 12a, 12b respectively abut against the surfaces 7a, 7b, 7c, 7d and that the surfaces 13a, 13b abut against the external surface of the wall 1a. This insures that the core magnet 11 is held in an optimum position with reference to the housing 1 and coil assembly 5. If it should become necessary to remove or replace the magnet 11, the operator simply removes the fastener 14 and thereupon withdraws the arm 10 and magnet 11 through the open side of the assembly 5 and through the opening 7 while the assembly 5 remains mounted in the housing. This saves considerable time because the withdrawal of staffs from the bearings 4 and reinsertion of staffs into such bearings must be carried out with considerably care. Another advantage of the just described construction is that the assembly 5 can be inserted or withdrawn by way of the opening 6 while the insert 9 remains attached to the housing 1. All that is necessary is to remove the bearings 4; the entire assembly 5 is thereupon ready to be withdrawn from the wall 1a by way of the opening 6.

The improved instrument can be modified without departing from the spirit of our invention. For example, the opening 6 or 7 can be omitted if the remaining opening is designed in such a way that it permits insertion and withdrawal of the magnet 11 and/or moving coil assembly 5. However, it is then necessary to remove the insert 9 prior to removal of the assembly 5.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

1. In an electrical instrument, a combination comprising a hollow housing having an opening; a hollow moving coil assembly turnably mounted in said housing substantially surrounded by the same and having an open side movable into at least partial registry with said opening; and an insert including a core magnet received in said moving coil assembly and a holder separably secured to said housing and having a portion extending through said opening and supportingly connected with said magnet, said magnet being withdrawable by way of said open side and said opening upon separation of said holder from said housing while said moving coil assembly remains turnably mounted in said housing.

2. A combination as defined in claim 1, wherein said housing has a substantially cylindrical wall and wherein said opening is provided in said cylindrical wall.

3. A combination as defined in claim 1, wherein said holder and said housing are provided with abutting locating surfaces for holding said magnet in a predetermined position with reference to said housing.

4. A combination as defined in claim 3, wherein the surfaces of said housing include at least one surface which flanks said opening and a portion of the external surface of said housing.

5. A combination as defined in claim 1, further comprising threaded fastener means separably securing said holder to said housing.

6. A combination as defined in claim 1, wherein said housing constitutes the feedback element of the moving-coil instrument.

7. A combination as defined in claim 1, wherein said housing comprises a substantially cylindrical first wall and two end walls extending transversely across the ends of said first wall, said end walls being provided with bearing means supporting said moving coil assembly for oscillatory movement about the axis of said first wall.

8. In an electrical instrument, a combination comprising a hollow housing having an opening; a hollow moving coil assembly turnably mounted in said housing and having an open side movable into at least partial registry with said opening; an insert including a core magnet received in said moving coil assembly, and a holder consisting of electrically insulating material and separably secured to said housing, said holder having a portion extending through said opening and supportingly connected with said magnet, said magnet being withdrawable by way of said open side and said opening upon separation of said holder from said housing; and electric terminal means provided on said holder.

9. A combination as defined in claim 8, further comprising spring retainer means provided on said terminal means.

10. In an electrical instrument, a combination comprising a hollow housing having a first opening; a hollow moving coil assembly turnably mounted in said housing and having an open side movable into at least partial registry with said first opening; and an insert including a core magnet received in said moving coil assembly and a holder separably secured to said housing and having a portion extending through said first opening and supportingly connected with said magnet, said magnet being withdrawable by way of said open side and said opening upon separation of said holder from said housing and said housing having a second opening by means of which said moving coil assembly can be withdrawn from said housing while said insert remains secured to said housing.